INVENTORS
JAMES WILLIAM ABSON
MANFRED LANDAU
MAURICE CARR LANGTON
ALAN MOLYNEUX

BY *Norris & Bateman*
ATTORNEYS

United States Patent Office 3,414,524
Patented Dec. 3, 1968

3,414,524
CATALYSIS
James W. Abson, Cheadle Heath, Stockport, Manfred Landau, Cheadle Hulme, Maurice C. Langton, Withington, Manchester, and Alan Molyneux, Ashton-on-Mersey, Sale, England, assignors to Simon-Carves Limited, Cheadle Heath, Stockport, England
Filed Sept. 18, 1964, Ser. No. 397,388
Claims priority, application Great Britain, Sept. 25, 1963, 37,663/63; July 23, 1964, 29,651/64
10 Claims. (Cl. 252—410)

ABSTRACT OF THE DISCLOSURE

Inactive catalytic material is activated or reactivated by contacting the material with a bacteria containing solution. Particularly useful are the sulfate-reducing bacteria which reduce the metal sulfate content of catalytic material containing an excess of metallic sulfate.

This invention is concerned with improvements in catalysis.

Certain previously proposed methods of activating material to provide catalytic activity have at times proved difficult and inconvenient. For example, thermal methods are often used to prepare catalysts comprising metals in the form of metal oxides; these methods are at times inconvenient and there is a danger of damage to the material resulting from excessive heating; for example the heating may lead to breakdown of lattice structure thus reducing surface area available for catalysis.

Also, for example, poisoned catalysts are often reactivated by thermal methods; again these methods are at times inconvenient and there is a danger of damage to the material.

It is an object of the invention to provide an improved method of activating material to provide catalytic activity.

We have found that material can be activated to provide catalytic activity by contacting with bacteria.

It is another object of the invention to provide a catalyst comprising material activated in this way.

The invention provides a catalyst comprising material activated to provide catalytic activity by contacting with bacteria.

The invention also provides a method of activating material to provide a catalyst comprising the steps of contacting the material with an aqueous liquor comprising bacteria and then removing the liquor from the material.

It appears that this bacterial method of activation is gentle and the risk of damage to the material is minimised; also it appears that the activated material shows good catalytic activity.

The bacterial liquor may, for example, be passed continuously through a fixed bed of the material. Alternatively an ebbing and flowing system may be used in which a fixed bed of the material is alternately completely immersed in bacterial liquor and then drained.

After removal of the liquor from the material the material may be heated to a temperature sufficient to fix its structure but not sufficiently high to permit excessive mobility within the crystal lattice, for example about 500° C. Where the material is impregnated on a carrier the heating tends to increase the surface area of the carrier by removal of bound water and to cause partial surface reaction between the carrier and the catalytically active material. However, the prepared material is produced in a fine state of subdivision which apparently provides good catalytic activity, and heating to a temperature above that at which the reaction to be catalysed is carried out may not be necessary.

The method of activation is applicable in the initial preparation of catalysts from virgin material. By the expression "virgin material" when used herein, we mean material which has not previously been used as a catalyst.

Although the virgin material can be treated in the raw state, preferably it is first impregnated onto a carrier. Examples of carriers are bauxite, activated alumina, magnesia, silica, clay, silicon carbide, sepiolite, bentonite, zeolites, artificially manufactured molecular sieves, refractory materials, e.g., firebrick and mixtures and compounds of any of these materials.

Impregnation can be carried out by various methods. In one method for example the carrier is immersed in a concentrated solution of the impregnant, followed by slow evaporation to dryness under atmospheric pressure. In another exemplary method the carrier is sprayed with a concentrated solution of the impregnant and dried. In a further exemplary method the carrier is immersed in a concentrated solution of the impregnant and subjected to vacuum distillation until dry. As an alternative to prior impregnation the carrier may be immersed in a dilute solution of the impregnant containing the bacteria, the impregnation and the bacterial reaction occurring simultaneously in this case.

The method of activation is also applicable to the reactivation of poisoned catalytic material.

Examples of bacteria which may be used include sulfate-reducing bacteria, e.g. *Desulfovibrio desulfuricans*, sulfide-oxidising bacteria, e.g. *Thiobacillus thiooxidans* and iron-oxidising bacteria, e.g. *Ferrobacillus ferrooxidans*. These bacteria all belong to the order *Pseudomonadales*.

For example, bauxite may be activated by treating it, under aerobic conditions, with liquor comprising iron-oxidising bacteria. It appears that this results in the separation of ferric hydroxide which can be washed away from the bauxtie either by the bacterial liquor or in a subsequent washing step, thus increasing the proportion of alumina in the bauxite; the surface area available for catalysis may also be increased. Before treatment with the iron-oxidising bacteria the bauxite may be treated under anaerobic conditions with liquor comprising sulfate-reducing bacteria.

Also, for example, bauxite may be activated by treatment with sulfide-oxidising bacteria. It appears that this results in the separation of iron sulfate which can be washed away from the bauxite either by the bacterial liquor or in a subsequent washing step, thus increasing the proportion of alumina in the bauxite; again the available surface area may be increased. The sulfide-oxidising bacteria require illumination.

Further for example, bacterial activation is readily applicable to materials comprising metallic sulfate, using sulfate-reducing bacteria. In this case sulfate is reduced to sulfide which in some cases is then hydrolysed to the hydroxide or the oxide.

Preferably in the case of sulfate-reducing bacteria the liquor comprises a nutrient solution of low sulfate concentration, the bacteria are grown in this solution at a temperature between 23° C. and 32° C. and the liquor is then contacted with the material comprising metallic sulfate at a temperature between 20° and 30° C.; the bacteria being in the logarithmic growth phase throughout contacting and the pH of the liquor being maintained between 5 and 8 (more preferably at 7) throughout growth and contacting.

Examples of catalysts which may be prepared using sulfate-reducing bacteria include those comprising any one of NiS, CoS, MnS, $Fe_2S_3$, $V_2S_3$, and $Mo_2S_3$ or mixtures thereof. Also, for example, a nickel subsulfide catalyst may be prepared by heating a mixture of nickel nitrate and nickel sulfate to 300° C. to provide a mixture of nickel oxide and nickel sulfate, contacting the material with the liquor to give a mixture of nickel oxide and nickel sulfide, separating the liquor, and then contacting the material with a reducing gas, for example coal gas, to give nickel subsulfide.

Further, for example, it appears that the activity of virgin "Nimox" catalyst, which comprises a mixture of nickel and molybdenum oxides and also comprises metallic sulfate, and has been thermally activated, may be enhanced by treatment with the liquor.

In a previously proposed method of preparing a catalyst for use in removing organic sulfur compounds from gases, a metal oxide, e.g. NiO is prepared and this is then "sulfided" by heating in contact with hydrogen sulfide; there is a danger of catalytic activity being destroyed during the sulfiding process. It will be realised that using the bacterial method a "sulfided" catalyst may be prepared directly from material comprising the metal sulfate without the necessity for first preparing the metal oxide and heating in contact with hydrogen sulfide.

Also, for example, an active alumina catalyst may be prepared by contacting aluminum sulfate with the liquor to give aluminum sulfide which is immediately hydrolysed to aluminum hydroxide, separating the liquor, and drying and heating the aluminum hydroxide to give alumina.

Certain of the catalysts described hereinabove, the nickel and alumina catalysts for example, may be used as guard catalysts in reducing the concentration in gases of organic sulfur compounds, unsaturated hydrocarbons and other compounds to minimise the rate of poisoning by said compounds of a main catalyst with which the gases are subsequently contacted. For example, the catalysts may be used for this purpose in the detoxification of fuel gas by the "shift" reaction, the gasification of petroleum reforming, and the hydrogenation of unsaturated compounds. The alumina catalysts may also be used in the Claus sulfur recovery process, viz. oxidation of hydrogen sulfide in gases to sulfur dioxide, and recovery of elemental sulfur by reaction between the sulfur dioxide so produced and further hydrogen sulfide in the gases:

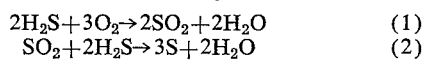
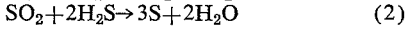

$$2H_2S + 3O_2 \rightarrow 2SO_2 + 2H_2O \quad (1)$$
$$SO_2 + 2H_2S \rightarrow 3S + 2H_2O \quad (2)$$

For example, the catalysts may be used in treating a waste gas comprising between 95% and 100% of an inert gas such as $CO_2$ and between 0% and 5% of $H_2S$.

Further examples of chemical reactions in which the catalysts may be used as main catalysts include the shift reaction, dehydration, cracking, isomerisation, dehydrogenation, defluorination, desulfurisation, gasification of petroleum, hydrogenation, hydrogenolysis, polymerisation, reforming, demethanation and oxidation of hydrocarbons.

The reactivation method using sulfate-reducing bacteria is applicable, for example, to the reactivation of poisoned catalysts in which metallic sulfate is present as a result of exposure to sulfur, for example in the form of gaseous sulfur dioxide or hydrogen sulfide, under oxidising conditions. The poisoned catalyst may have been originally prepared either by thermal activation and/or by the above bacterial method of preparation. In this case after separation of the liquor the catalyst may be heated to provide further activity; this may result in the conversion of metallic sulfide to oxide and the removal of bound water. However, often the activity of the catalyst after the separation is high enough to render unnecessary heating to a temperature above that at which the reaction to be catalysed is carried out.

An example of a poisoned catalyst in which metallic sulfate is present is a bauxite used as a catalyst in the Claus sulfur recovery process. In reactivating this catalyst it is contacted with the liquor comprising sulfate-reducing bacteria which causes aluminum sulfate to be reduced to aluminum sulfide. The aluminum sulfide is immediately hydrolysed to aluminum hydroxide. We have found that after removal of the liquor it is often not necessary to activate the catalyst further by heating to a temperature above that at which the reaction to be catalysed is carried out. However, the catalyst may be heated to a temperature between 400° C. and 530° C. to convert the aluminum hydroxide to oxide and to remove any bound water.

Other examples of a poisoned catalyst in which metallic sulfate may be present are $Fe_2O_3$, $Fe_3O_4$, CaO, NiO, MnO, MgO, "Nimox" and "Comox," which comprises cobalt and molybdenum oxides, and a "Segas" catalyst which is a reforming catalyst comprising an MgO carrier with free CaO; the "Segas" catalyst may be used, for example, to catalyse the cyclic gasification of hydrocarbons. (Segas catalyst is described in The Gas Council Research Communication GC98, The Gas Council, London, England, 1963.) In the case of calcium and magnesium the sulfate is readily hydrolysable and the same procedure as for bauxite may be carried out. In the case of $Fe_2O_3$, $Fe_3O_4$, NiO, MnO, "Nimox" and "Comox" it may be necessary to convert sulfides to oxides by carefully controlled thermal oxidation.

The reactivation may be carried out in the catalytic reactor itself.

In a previously proposed method of reactivation the catalyst was removed from the reactor, leached with water, recharged and thermally activated. In this method a wasteful loss of catalyst was involved on account of the removal from the reactor and the leaching.

It is another object of the invention to provide chemical plant adapted for use in treating material to provide catalytic activity.

The invention also provides chemical plant comprising a reactor which contains a bed of material to be activated to provide catalytic activity, a container containing aqueous liquor comprising bacteria adapted to activate the material, means for separating solid and liquid, means for interconnecting the reactor, the container and the separating means, and means for circulating the liquor through the reactor and the separating means and back to the reactor.

There now follows a description, to be read with reference to the accompanying drawings of plant embodying the invention. This description is given by way of example only and not by way of limitation of the invention.

Figure 1:
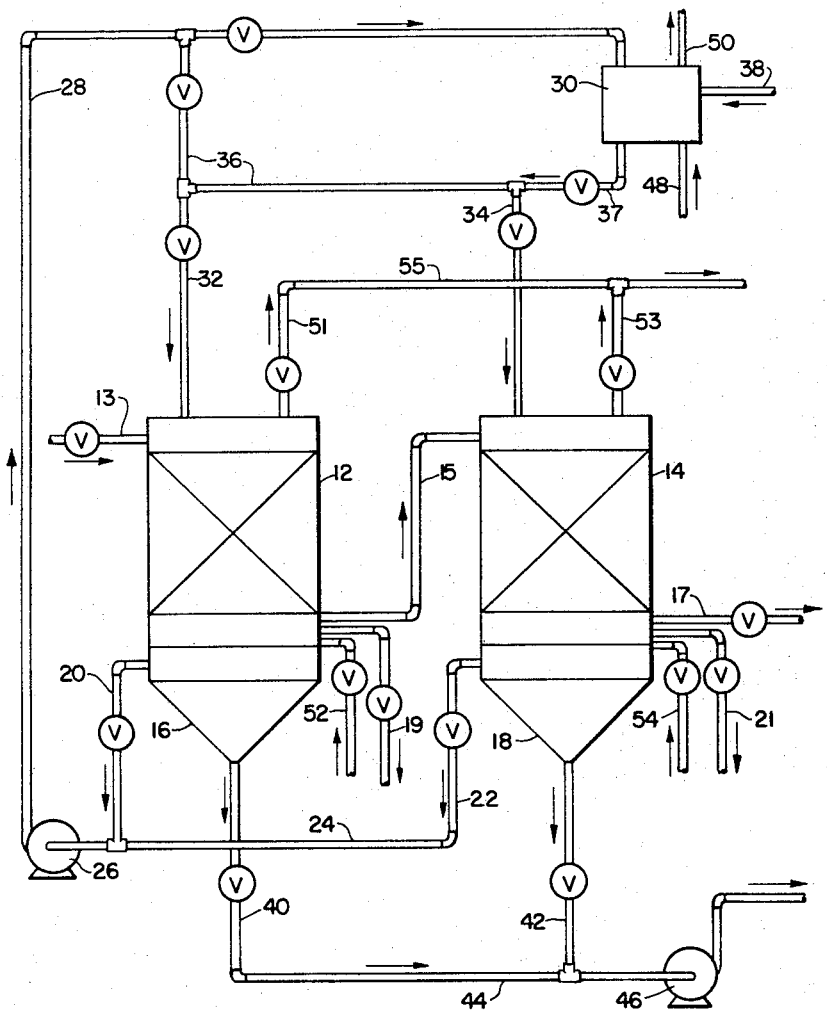
FIGURE 1 shows a flow diagram of plant embodying the invention.

The plant shown in FIGURE 1 is adapted for use in treating a waste gas comprising $H_2S$. For example, the gas may comprise between 95% and 100% of $CO_2$ and between 0% and 5% $H_2S$ as described hereabove.

The plant comprises two reactors 12, 14 both of known type, through which the gas is passed, in series flow from the reactor 12 to the reactor 14. The gas enters the reactor 12 by a line 13, passes between the reactors 12, 14 by a line 15 and leaves the reactor 14 by a line 17. The stoichiometric quantity of air for the reaction (1)

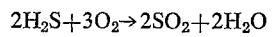

$$2H_2S + 3O_2 \rightarrow 2SO_2 + 2H_2O$$

is mixed with the gas entering the reactor 12 and this reaction takes place therein. In the reactor 14 the reaction (2) takes place:

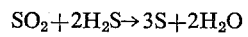

$$SO_2 + 2H_2S \rightarrow 3S + 2H_2O$$

Sulfur leaves the reactors 12, 14 by lines 19, 21 respectively.

Reaction (2) may also take place to a certain extent in the reactor 12.

Each reactor 12, 14 is upright and the gas is passed downwardly therethrough, sulfur being taken off near the bottom. Also, each reactor contains a fixed catalyst bed comprising a bauxite catalyst, which in time becomes poisoned.

The plant also comprises two sludge clarifiers 16, 18, also of known type, secured to the lower end portion of the reactor 12 and to the lower end portion of the reactor 14 respectively. Lines 20, 22 lead from upper portions of the clarifiers 16, 18 respectively to a line 24 leading to a pump 26 from which a line 28 leads to a bacterial culture tank 30 containing an aqueous liquor comprising sulfate-reducing bacteria; lines 32, 34 lead to the tops of the reactors 12, 14 respectively from a line 36 which leads from the line 28; a line 37 leads from the tank 30 to the line 36. Another line 38 leads from a supply of nutrient solution to the culture tank. Lines 40, 42 lead from the bases of the clarifiers 16, 18 respectively to a line 44 leading to a pump 46 arranged to pump away sludge from the clarifiers.

Inert gas, preferably comprising carbon dioxide, for example, gas treated in the plant, is supplied to the culture tank 30 continuously to maintain anaerobic conditions therein and means is provided for maintaining the temperature in the culture tank at a required level; the inert gas enters the tank 30 from a line 48 and leaves by a line 50.

When it is required to reactivate the bauxite in one of the reactors 12, 14 say the reactor 12, the reactor is first purged using an upward flow of inert gas, for example, gas treated in the plant; the flow of inert gas being maintained throughout the reactivation; the inert gas enters the reactor 12 from a line 52 and leaves by a line 51, which leads into a line 55. (Inert gas may enter the reactor 14 by a line 54 and leave by a line 53 which also leads into the line 55.) Bacterial liquor from the tank 30 is then passed through the line 32, downwardly through the catalyst bed and the clarifier of the reactor. When a steady state is reached the liquor is circulated by the pump 26 from the clarifier through the lines 28, 36, 32 and back to the reactor until reactivation is complete; make-up liquor may be supplied from the tank 30 to the line 36 through the line 37; provision is made for liquor to be returned to the tank 30 through the line 28; sludge comprising fine particles of catalyst is separated from the liquor in the clarifier and pumped away by the pump 46. The inert gas leaving the reactor and the tank 30 together with hydrogen sulfide produced by the action of the bacteria in the reactor and in the tank 30 is passed through the lines 50, 55 respectively to the gas to be treated in the plant for the recovery of sulfur. The catalyst is then dried using inert gas at 110° C., for example gas treated in the plant. The catalyst may now be sufficiently active, but if necessary, the catalyst is further heated by passing a stream of air through the reactor to provide further activity. The gas to be treated may now be passed through the reactor again.

Figure 2:
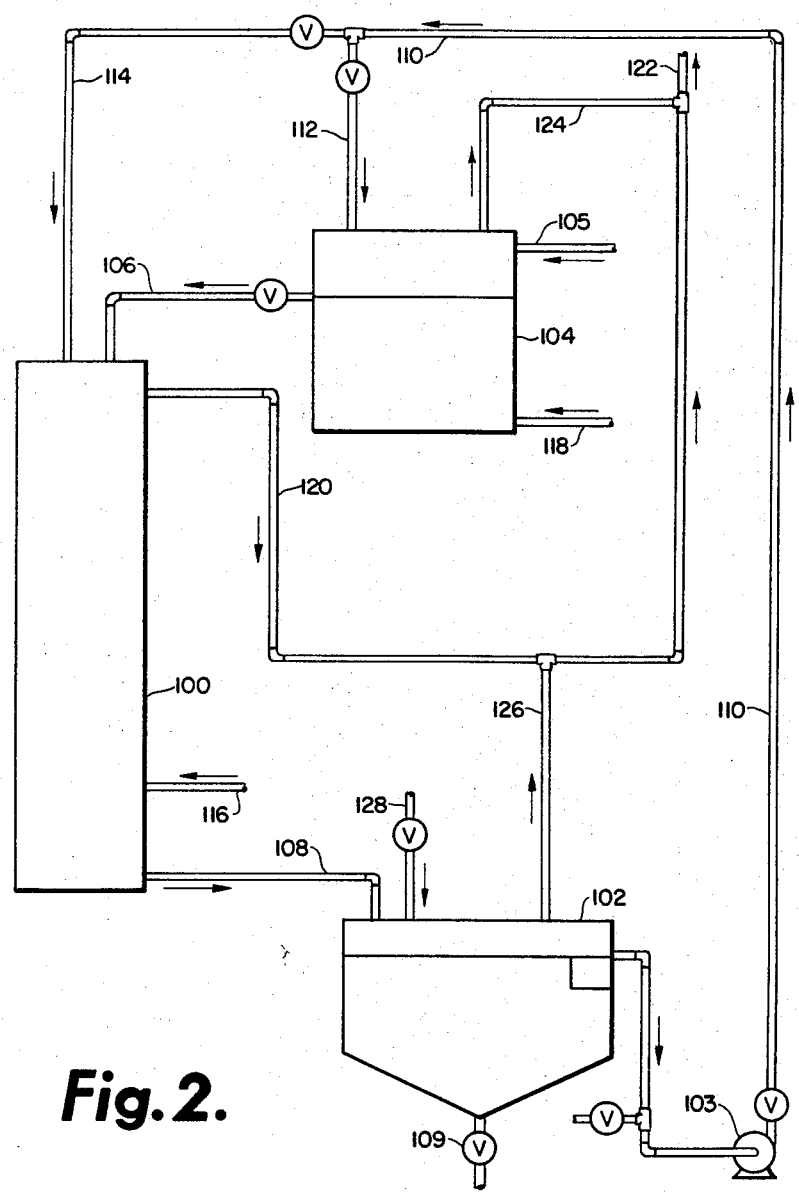
FIGURE 2 shows a flow diagram of another plant embodying the invention.

The plant shown in FIGURE 2 is adapted for use in the preparation or reactivation of catalytically active material.

The plant comprises a vertical tubular reactor 100, a settling tank 102, a bacterial culture tank 104 and a pump 103 arranged to circulate liquor from the tank 103 through the reactor 100 and the tank 102.

In the operation of the plant a fixed bed of material comprising metallic sulfate which is to be activated to provide catalytic activity is contained in the reactor 100, and aqueous liquor comprising sulfate-reducing bacteria is contained in the tank 104. Liquor from the tank 104 is passed downwardly through the bed of material in the reactor 100 and from the reactor 100 to the top of the tank 102 through a line 108. Nutrient enters the tank 104 through a line 105. Clear liquor from the tank 102 is pumped by the pump 103 back to the reactor 100 through a line 110 and a line 114; make-up liquor may be supplied to the reactor 100 from the tank 104 through a line 106. The clarifier 102 comprises a sludge outlet 109. Provision is also made for liquor from the line 110 to be passed to the tank 104 through a line 112. Inert gas, preferably comprising a source of carbon e.g. $CO_2$, is passed into a lower portion of the reactor 100 through a line 116 and into a lower portion of the tank 104 through a line 118. The inert gas passes from an upper portion of the reactor 100 through a line 120 to a vent line 122 and inert gas passes from the tank 104 through a line 124 to the vent line 122; a line 126 leads to the line 120 from the tank 102. The gas passing into the vent line 122 comprises hydrogen sulfide and is passed to plant for the removal of this hydrogen sulfide. A line 128 provides for the addition of alkali for pH adjustment or of nutrient to the tank 102.

The bauxite materials described hereinbefore may be from bauxite minerals in which the aluminum oxide is present predominantly as the trihydrate, or from bauxite minerals in which a substantial proportion of the aluminum oxide is present as the monohydrate.

EXAMPLE I

| Nutrient solution: | Grams per litre (aqueous solution) |
|---|---|
| Sodium lactate | 3.5 |
| Yeast extract | 1.0 |
| L-cystene hydrochloride | 0.8 |
| Dipotassium hydrogen phosphate | 0.5 |
| Ammonium chloride | 1.0 |
| Calcium chloride | 0.1 |
| Magnesium sulfate | 2.0 |
| Sodium sulfate | 0.5 |
| Ferrous ammonium sulfate | 0.4 |

450 ml. of this nutrient solution was inoculated with the sulfate reducing bacteria *Desulfovibrio desulfuricans* (El Agheila Z-strain), and 200 grams of a bauxite catalyst poisoned in the operation of an $H_2S$ waste gas treatment plant were treated with the inoculated solution at 30° C., nitrogen being bubbled through the solution throughout. After about 7 days the bauxite was filtered off and dried at 80° C. The pH of the solution was kept between 5 and 8 throughout.

Before the treatment the sulfate content of the bauxite calculated as percentage $SO_3$ was 2.27% and after treatment was 0.106%.

The catalytic activity, after treatment, for reactions (1) and (2) above was good.

EXAMPLE II

The procedure of Example I was repeated with a different sample of poisoned bauxite catalyst.

Before the treatment the sulfate content, calculated as percentage $SO_3$ was 14.96% and the available surface area was 14.5 $(metre)^2$/gram. After treatment the sulfate content was 1.48% and the available surface area 193.3 $(metre)^2$/gram. Again the catalytic activity for the said reactions was good.

EXAMPLE III

The procedure of Example I was reepated with a further sample of poisoned bauxite catalyst.

Before the treatment the sulfate content was 4.16% and after treatment was 1.03%. The catalytic activity, after treatment, for the said reactions was good.

EXAMPLE IV 15 grams of the poisoned bauxite catalyst described in Example II were treated with 50 ml. of the inoculated nutrient solution described in Example I. Nitrogen was bubbled through the solution before inoculation to remove oxygen and then the solution was sealed against contact with the air. After 12 days at 30° C. the bauxite was filtered off and dried and the available surface area after treatment was 200.3 $(metre)^2$/gram. Again the catalytic activity for reactions (1) and (2) was good.

EXAMPLE V

Nutrient solution:

| | Grams per litre (aqueous solution) |
|---|---|
| Sodium lactate | 3.5 |
| Yeast extract | 1.0 |
| L-cystene hydrochloride | 0.8 |
| Dipotassium hydrogen phosphate | 0.5 |
| Ammonium chloride | 1.0 |
| Calcium chloride | 0.1 |
| Magnesium chloride | 0.5 |
| Magnesium sulfate | 0.2 |

This solution was fed continuously into a culture tank containing the sulfate reducing bacteria described in Example I, and bacterial liquor from the tank was passed continuously for 11 days through a fixed bed comprising 200 grams of the poisoned bauxite catalyst described in Example II. The flow rate was about 750 ml./day and the temperature in the tank was maintained at 30° C., the temperature of the solution when it reached the catalyst bed being about 20° C. The pH of the liquor was about 7 throughout. Nitrogen was passed through the catalyst bed and bubbled through the solution in the culture tank throughout. After treatment the catalyst had an available surface area of 206.3 (metre)$^2$/gram and a sulfate content of 0.74%.

EXAMPLE VI

A gas containing 3.5% $H_2S$ and 96.5% $N_2$ was mixed with the stoichiometric amount of air required for complete oxidation and passed at a space velocity of 2,400 volumes of gas per unit catalyst volume per hour, a temperature of 385° C. and under atmospheric pressure through a fixed catalyst bed comprising the poisoned bauxite catalyst described in Example II. The concentration of $H_2S$ in the gas leaving the catalyst bed was about 2.7 parts per million. This procedure was repeated with the reactivated catalyst described in Example V and the concentration of $H_2S$ in the gas leaving the catalyst bed was about one part per million. After ten hours continuous passage of the gas the available surface area of the reactivated catalyst was 122.2 (metre)$^2$/gram.

The bauxite catalysts described in the above examples were all initially activated by heating a bauxite mineral from Ghana in which the aluminum oxide is present predominantly as the trihydrate and which has the following inorganic analysis: $SiO_2$, 3.06%; $TiO_2$, 1.25%; Fe, 16.48%; $Al_2O_3$, 65.28%; CaO, 0.28%; MgO, nil; and loss on ignition, 11.02%.

EXAMPLE VII

A bauxite carrier was impregnated with nickel sulfate and the procedure of Example V was repeated; 150 grams of the impregnated bauxite being treated for 7 days at a flow rate of about 750 ml. per day. About 70% of the nickel originally impregnated was still present on the carrier after the bacterial treatment and the material showed catalytic activity.

EXAMPLE VIII

The procedure of Example V was substantially repeated using 150 grams of a bauxite catalyst poisoned in the operation of an $H_2S$ waste gas treatment plant similar to the one described with reference to FIGURE 1 of the drawings.

The bacterial liquor was passed continuously through the catalyst bed for seven days. Before the treatment the available surface area of the bauxite was 9.8 m.$^2$/gm. and after the treatment it was 228.3 m.$^2$/gm. The composition of the bauxite before and after the treatment was as follows:

| | Before, percent | After, percent |
|---|---|---|
| Loss on ignition | 29.95 | 21.92 |
| $Al_2O_3$ | 46.99 | 53.37 |
| $SiO_2$ | 7.18 | 9.00 |
| Ferric iron ($Fe_2O_3$) | 13.40 | 13.50 |
| CaO | 0.22 | 0.28 |
| MgO | 0.08 | Nil |
| $TiO_2$ | 0.94 | 0.40 |
| Ferrous iron ($Fe_2O_3$) | Nil | Nil |
| Water soluble sulfate ($SO_3$) | 17.22 | 0.66 |
| Sulfide ($H_2S$) | Nil | 0.008 |
| Elemental sulfur | 0.32 | Nil |

EXAMPLE IX

The procedure of Example VIII was substantially repeated using 100 grams of the catalyst, a bacterial liquor flow rate of about 470 ml./day for seven days and the following nutrient solution:

| | Grams per litre (aqueous solution) |
|---|---|
| Sodium lactate | 3.5 |
| Dipotassium hydrogen phosphate | 0.5 |
| Ammonium chloride | 1.0 |
| Calcium chloride | 0.1 |
| Magnesium chloride | 0.5 |
| Magnesium sulfate | 2.0 |
| Ferrous ammonium sulfate | 0.06 |

The surface area of the bauxite after treatment was 210.5 m.$^2$/gram.

The composition of the bauxite after the treatment was as follows:

| | Percent |
|---|---|
| Loss on ignition | 19.47 |
| $Al_2O_3$ | 54.06 |
| $SiO_2$ | 7.47 |
| Ferric iron ($Fe_2O_3$) | 15.24 |
| CaO | 0.11 |
| MgO | Nil |
| $TiO_2$ | 1.42 |
| Ferrous iron ($Fe_2O_3$) | Nil |
| Water soluble sulfate ($SO_3$) | 1.31 |
| Sulfide ($H_2S$) | Nil |
| Elemental sulfur | 2.02 |

EXAMPLE X

The procedure of Example V was substantially repeated using 180 grams of a "Nimox" catalyst comprising a mixture of nickel and molybdenum oxides on an alumina support poisoned in use as a guard catalyst for the shift reaction. The catalyst was in the form of ⅛" diameter stearate lubricated pellets.

The bacterial liquor was passed continuously through the catalyst bed for three and a half days at a flow rate of about 170 ml./day. Before the treatment the sulfate content of the catalyst was 14.89% and after treatment the total sulfur (as $SO_3$) was 6.91%. The material was again active as a guard catalyst.

EXAMPLE XI

The procedure of Example X was substantially repeated using 120 grams of the catalyst. The bacterial liquor was passed through the catalyst for eight days. After the treatment the total sulfur content (as $SO_3$) was 6.74% and the material was again active as a guard catalyst.

EXAMPLE XII

The procedure of Example X was substantially repeated using 162 grams of an unused "Nimox" catalyst containing sulphate and a flow rate of about 600 ml./day for five days. Before the treatment the sulphate content of the catalyst was 3.63%; after treatment the sulphate content was 0.41% and the catalytic activity of the material was enhanced.

EXAMPLE XIII

The procedure of Example XII was substantially repeated for seven days. After treatment the sulphate content was 0.27% and the catalytic activity of the material was enhanced.

EXAMPLE XIV

The procedure of Example V was substantially repeated using 258 grams of a Segas catalyst poisoned in use as a catalyst for the cyclic gasification of hydrocarbons.

The bacterial liquor was passed continuously through the catalyst bed for seven days at a flow rate of about 650 ml./day. The composition of the catalyst before and after the treatment was as follows:

|  | Before, percent | After, percent |
| --- | --- | --- |
| Loss on ignition | 0.71 | 0.91 |
| SiO$_2$ | 2.60 | 3.57 |
| Al$_2$O$_3$ | 0.41 | 0.43 |
| Iron oxide (Fe$_2$O$_3$) | 0.43 | 0.48 |
| Titanium oxide | 0.10 | 0.13 |
| CaO (free) | 3.86 | 2.33 |
| CaO (total) | 6.63 | 6.72 |
| MgO | 80.35 | 79.32 |
| Na$_2$O | 0.05 | 0.08 |
| K$_2$O | 0.01 | 0.02 |
| Vanadium (V$_2$O$_5$) | 0.36 | 0.06 |
| Nickel (NiO) | 5.61 | 6.32 |
| Sulfate (SO$_3$) | 3.14 | 1.65 |
| Sulfide (S) | 0.067 | 0.033 |

The resistance to crushing of the material was not adversely affected by the treatment and apparently its catalytic activity for the cyclic gasification was enhanced.

EXAMPLE XV

The procedure of Example XIV was substantially repeated using 116 grams of the catalyst. Instead of passing the liquor continuously through the catalyst bed an ebbing and flowing system was used in which the bed was alternately completely immersed in bacterial liquor and then drained. The composition of the catalyst after treatment was as follows:

|  | Percent |
| --- | --- |
| Loss on ignition | 8.19 |
| SiO$_2$ | 2.33 |
| Al$_2$O$_3$ | 0.34 |
| Iron oxide (Fe$_2$O$_3$) | 0.39 |
| TiO$_2$ | Nil |
| CaO (free) | 2.93 |
| CaO (total) | 7.54 |
| MgO | 73.69 |
| Na$_2$O | 0.06 |
| K$_2$O | 0.02 |
| Vanadium (V$_2$O$_5$) | 0.13 |
| Nickel (NiO) | 5.33 |
| Sulfate (SO$_3$) | 1.36 |
| Sulfide (S) | 0.04 |

Again the resistance to crushing of the material was not adversely affected and its catalytic activity was apparently enhanced. The cold crushing strength of the material before treatment was about 29,500 lbs./square inch; after the treatment it was about 26,000 lbs./square inch; and after the treatment and subsequent firing and autoclaving with steam it was again about 29,500 lbs./square inch.

EXAMPLE XVI

A gas containing 3.5% H$_2$S and 96.5% N$_2$ was mixed with the stoichiometric amount of air required for complete oxidation and passed at a space velocity of 2,700 volumes of gas per unit catalyst volume per hour, a temperature of 380° C. and under atmospheric pressure through a fixed catalyst bed comprising the poisoned bauxite catalyst described in Example VIII. The concentration of H$_2$S in the gas leaving the catalyst bed was about 4.3 parts per million. This procedure was repeated with the reactivated catalyst described in Example VIII and the concentration of H$_2$S in the gas leaving the catalyst bed was about 1.5 parts per million. After 14 hours continuous passage of the gas the available surface area of the reactivated catalyst was 106.3 (metre)$^2$/gram.

EXAMPLE XVII

A thermally activated alumina silica carrier, consisting of hollow cylindrical particles each ¾ inch long by ½ inch diameter and having a ⅛ inch diameter central hole, was impregnated with nickel sulfate by immersion in a concentrated solution of nickel sulfate and vacuum distillation at 70° C. until dry; the procedure was carried out in three stages, the whole of the carrier being immersed in the same quantity of the nickel sulfate solution in each stage and the vacuum distillation to dryness also being carried out in each stage.

The procedure of Example XV was then substantially repeated using 21.25 grams of the material. The bacterial liquor was passed through the catalyst bed using the ebbing and flowing system for five days at a flow rate of about 500 ml./day.

Before treatment the material contained 1.87% Ni, and 2.61% sulfate (SO$_3$). After treatment it contained 0.2% Ni and 0.75% sulfate and it was catalytically active.

EXAMPLE XVIII

The impregnated carrier of Example XVII was calcined at 300° C. for two hours and then the procedure of Example XVII was substantially repeated with a flow rate of 460 ml./day and using 25 grams of the material. Before bacterial treatment the material contained 1.55% Ni and 2.22% sulfate. After treatment it contained 0.86% Ni and Ni and 0.75% sulfate and it was catalytically active.

EXAMPLE XIX

The procedure of Example XVIII was substantially repeated with calcination at 500° C. for two hours, a flow rate of 460 ml./day and using 18.65 grams of the material. Before treatment the material contained 1.91% Ni and 2.45% sulfate. After treatment it contained 0.24% Ni and 0.41% sulfate and it was catalytically active.

EXAMPLE XX

A powdered thermally activated bauxite carrier prepared from a Greek monohydrate bauxite was immersed in a concentrated solution of nickel sulfate followed by slow evaporation to dryness; this procedure was carried out in several stages using the whole of the carrier in each stage; the material was then allowed to cool and set hard and then ground and sieved. The procedure of Example V was then substantially repeated for ten days. Before the bacterial treatment the nickel content of the material was 5.47%, its sulfate content 7.47%, and its sulfide content nil; after the treatment the nickel content was 0.5%, the sulfate content 0.4% and there was a trace of sulfide in the material. Also the material was catalytically active.

EXAMPLE XXI

The thermally activated bauxite carrier of Example XX was sprayed with a concentrated solution of nickel sulfate at room temperature and dried at 100° C.; this procedure was carried out in several stages using the whole of the carrier in each stage.

The procedure of Example V was then substantially repeated for seven days. Before the bacterial treatment the nickel content of the material was 5.47%, its sulfate content and the sulfide content 0.006%. Again the material was catalytically active.

EXAMPLE XXII

The procedure of Example XXI was substantially repeated for five days using a concentrated solution of aluminum and nickel sulfates. Before the bacterial treatment the nickel content was 2.96%, the sulfate content 11.47% and the sulfide content nil; after the bacterial treatment the nickel content was 0.87%, the sulfate content 0.12%, and the sulfide content 0.002%. It appears that in this example, the aluminum sulfate acted to bind a surface layer of nickel sulfide to the carrier.

EXAMPLE XXIII

The bacterially treated catalyst of Example XIII was used as a guard catalyst in the shift reaction. At an average temperature of 370° C. and a space velocity of about 1,300 volumes of gas per unit catalyst volume per hour acetylene first became apparent in the gas leaving the catalyst after about one month's operation.

Under more favourable conditions of temperature and space velocity using the catalyst before bacterial treatment acetylene became apparent in the gas leaving the catalyst after about one week's operation.

EXAMPLE XXIV

The procedure of Example XX was substantially repeated using a sepiolite carrier. The bacterial treatment was carried out for five days using 20 grams of the material. The material was pelleted after sieving and was used as a guard catalyst for the shift reaction. The nickel content of the pelleted material was about 5% and the sulfate content negligible. Acetylene removal from town gas containing about 0.1% acetylene was maintained at 80% of the inlet value; the space velocity was 1,000 volumes gas/volume catalyst per hour and the temperature of the catalyst was 370° C.

What we claim is:

1. A method of producing catalytically active material comprising the steps of contacting the material in its inactive or poisoned state with a culture comprising bacteria which transforms the inactive or poisoned material into an activated or near activated state, and removing the culture from the transformed material.

2. A method as recited in claim 1 wherein the inactive material is a metal sulfate-containing material and the bacteria are sulfate-reducing bacteria.

3. A method of producing a catalytically active bed by the method claimed in claim 2 comprising the steps of contacting under anaerobic conditions material comprising sepiolite impregnated with nickel sulfate with an aqueous culture comprising *Desulfovibrio desulfuricans* at a temperature between 20° C. and 30° C. and a pH between 5 and 8 to reduce nickel sulfate to nickel sulfide, removing the culture from the treated material, drying the material, and charging the treated material into a catalytic reactor to provide the catalytic bed.

4. A method of activating or reactivating solid catalytic material containing metallic sulfate to produce effective catalytic activity of said material comprising the steps of providing a body of said material, contacting the material in said body with one or more reactive solutions selected from the group consisting essentially of culture liquors containing sulfate-reducing bacteria, sulfide-oxidising bacteria and iron-oxidising bacteria for a period until the metallic sulfate content of the material is lowered sufficiently that the material is capable of effective catalytic action, separtating the liquor from the treated material remainder, and drying the material remainder.

5. In the method defined in claim 4, the step of impregnating a solid carrier with said material to provide said body and passing the solution through said carrier.

6. In the method defined in claim 5, said carrier being one or more substances selected from the group consisting essentially of bauxite, activated alumina, magnesia, silica, clay, silicon carbide, sepiolite, bentonite, zeolites, artificially manufactured molecular sieves, and refractory materials such as firebrick.

7. In the method defined in claim 4, said material being one or more compounds of metal selected from the group consisting essentially of aluminum, nickel, cobalt, magnesium, molybdenum and calcium and oxides thereof.

8. In the method defined in claim 4, the step of passing an inert gas through said body while it is being contacted with said material.

9. In the method defined in claim 4, the step of continuously recirculating said solution through said material body during said period.

10. In the method defined in claim 4, the steps of continually withdrawing hydrogen sulfide containing gas produced by reaction of the bacteria with said metallic sulfate and recovering sulfur from said gas.

References Cited

UNITED STATES PATENTS

| | | | |
|---|---|---|---|
| 2,813,821 | 11/1957 | Updegraff | 195—116 |
| 3,020,205 | 2/1962 | Jensen | 195—2 |
| 3,218,252 | 11/1965 | Glover et al. | 210—4 |
| 3,305,353 | 2/1967 | Duncan et al. | 195—2 |

FOREIGN PATENTS 37,209    1/1962    Japan.

DANIEL E. WYMAN, *Primary Examiner.*

C. F. DEES, *Assistant Examiner.*

UNITED STATES PATENT OFFICE
CERTIFICATE OF CORRECTION

Patent No. 3,414,524

December 3, 1968

James W. Abson et al.

It is certified that error appears in the above identified patent and that said Letters Patent are hereby corrected as shown below:

Column 5, line 1, "sulful" should read -- sulphur --. Column 10, line 38, "Ni and 0.75%" should read -- 0.459% --; line 71, before "and the sulfide" insert -- tent 7.47%, and its sulphide content nil; after the treatment the nickle content was 1.1%, the sulphate content 0.23% and the sulphide --. Column 12, line 13, "separtaing" should read -- separating --.

Signed and sealed this 10th day of March 1970.

(SEAL)
Attest:

Edward M. Fletcher, Jr.
Attesting Officer

WILLIAM E. SCHUYLER, JR.
Commissioner of Patents